US011466725B2

(12) United States Patent
Pethick et al.

(10) Patent No.: US 11,466,725 B2
(45) Date of Patent: Oct. 11, 2022

(54) COMPOSITE SHAFT (71) Applicant: Crompton Technology Group Limited, Solihull (GB)

(72) Inventors: Jon Pethick, Leicestershire (GB); Robert Edwin Finney, Charlbury (GB); James William Bernard, Brackley (GB)

(73) Assignee: CROMPTON TECHNOLOGY GROUP LIMITED, West Midlands (GB)

( * ) Notice: Subject to any disclaimer, the term of this patent is extended or adjusted under 35 U.S.C. 154(b) by 0 days.

(21) Appl. No.: 17/087,817

(22) Filed: Nov. 3, 2020

(65) Prior Publication Data
US 2021/0131482 A1 May 6, 2021

(30) Foreign Application Priority Data

Nov. 6, 2019 (EP) ..................................... 19275118

(51) Int. Cl.
*F16C 3/02* (2006.01)
*F16D 1/092* (2006.01)
(52) U.S. Cl.
CPC .............. *F16C 3/026* (2013.01); *F16D 1/092* (2013.01); *F16C 2226/12* (2013.01); *F16C 2229/00* (2013.01)
(58) Field of Classification Search
CPC ........ F16B 4/004; F16B 17/004; F16C 3/023; F16C 3/026; F16C 7/026; F16C 2226/12;
(Continued)

(56) References Cited

U.S. PATENT DOCUMENTS

| 4,026,006 A | | 5/1977 | Moebius | |
|---|---|---|---|---|
| 4,256,412 A | * | 3/1981 | Tybus | ..................... F16C 7/026 403/267 |

(Continued)

FOREIGN PATENT DOCUMENTS

| DE | 4107222 A1 * | 4/1992 | .............. F16C 3/026 |
|---|---|---|---|
| DE | 29614242 U1 * | 10/1996 | .............. F16C 3/026 |

(Continued)

OTHER PUBLICATIONS

English Abstract of FR 2444880A1.
Extended European Search Report for International Application No. 19275118.8 dated Apr. 17, 2020, 9 pages.

*Primary Examiner* — Josh Skroupa
(74) *Attorney, Agent, or Firm* — Cantor Colburn LLP (57) ABSTRACT

A composite shaft with an end fitting mounted on one end of said shaft and a preload structure arranged to provide a biasing force to bias the composite shaft against the end fitting. The end fitting has a first interface surface, the first interface surface being tapered at an angle to the shaft axis and the shaft has a second interface surface for engagement with the first interface surface and is tapered at an angle to the shaft axis, the second interface surface extending axially from a first end to a second end, the shaft being thicker at the second end than at the first end. The shaft has a third interface surface and the preload structure has a fourth interface surface and the contact pressure of the third interface against the fourth interface increases from the first end of the shaft to the second end of the shaft.

18 Claims, 7 Drawing Sheets (58) Field of Classification Search
CPC ...... F16C 2229/00; F16D 1/0852; F16D 1/09; F16D 1/092; F16D 2001/0903
USPC .......................................... 464/181, 182, 183
See application file for complete search history.

(56) References Cited

U.S. PATENT DOCUMENTS

| | | | | |
|---|---|---|---|---|
| 4,319,076 A | * | 3/1982 | Piur | H01B 17/40 285/55 |
| 4,353,268 A | * | 10/1982 | Picard | F16C 7/026 74/587 |
| 4,451,245 A | * | 5/1984 | Hornig | F16C 3/026 464/181 |
| 4,663,819 A | * | 5/1987 | Traylor | F16C 3/026 464/181 |
| 4,886,944 A | * | 12/1989 | Christopher | F16C 7/026 200/48 R |
| 4,895,351 A | * | 1/1990 | Devaud | F16C 7/026 464/181 |
| 5,443,099 A | * | 8/1995 | Chaussepied | F16L 47/24 138/139 |
| 5,452,921 A | | 9/1995 | Hyatt et al. | |
| 5,601,493 A | * | 2/1997 | Nakazono | F16C 3/026 464/181 |
| 5,964,486 A | | 10/1999 | Sinclair | |
| 6,379,763 B1 | * | 4/2002 | Fillman | F16C 7/026 428/36.9 |
| 10,316,665 B2 | | 6/2019 | Virkler | |
| 2016/0153489 A1 | | 6/2016 | Pollitt et al. | |
| 2018/0283458 A1 | * | 10/2018 | Bernard | F16C 3/026 |

FOREIGN PATENT DOCUMENTS

| | | | | |
|---|---|---|---|---|
| DE | 102013103769 B3 | * | 10/2014 | ............ F16C 3/026 |
| EP | 0816702 A2 | * | 1/1998 | ............ F16C 3/026 |
| EP | 3203094 A1 | | 8/2017 | |
| EP | 3382219 A1 | | 10/2018 | |
| FR | 2444880 A1 | | 7/1980 | |
| SU | 1742090 A1 | * | 6/1992 | ......... B29C 37/0082 |
| WO | WO-2005054694 A1 | * | 6/2005 | ............ F16C 3/026 |
| WO | 2007127394 A2 | | 11/2007 | |

* cited by examiner

Fig. 1a
Prior art

Interface pressures over joint length

Fig. 10

COMPOSITE SHAFT

FOREIGN PRIORITY

This application claims priority to European Patent Application No. 19275118.8 filed Nov. 6, 2019, the entire contents of which is incorporated herein by reference.

TECHNICAL FIELD

The present disclosure relates to composite end connections, in particular end connections of a composite structural component made of a polymer matrix composite material. This disclosure is particularly concerned with end connections that can transmit axial loads to/from a composite structural component.

BACKGROUND

Composite structural components are typically made of a polymer matrix composite (PMC) material, often a fibre-reinforced polymer matrix composite material using glass and/or carbon fibre reinforcement, e.g. carbon fibre reinforced polymer (CFRP). Composite structural components offer the opportunity for lightweight and cost effective load transmission solutions. The largest benefits are often achieved when the load path and geometry are simple. Axial load transmission components, for example rods and struts, are ideal candidates for polymer matrix composite material and such composite structural components are extensively used on commercial aircraft. These composite structural components generally require an end connection having a complex form to interface with other components. Metals are often used as they are efficient in terms of weight and cost for forming an end connection having a complex geometry. However, joining a composite structural component to a metallic component to form an end connection poses significant challenges, especially in the aerospace industry where the joint must be formed in a robust and certifiable manner.

Filament wound structures are typically formed by winding filaments such as carbon fibres around a mandrel in a helical fashion so as to build up a tube shaped shaft. The angle of the helical winding influences the properties of the shaft. For example, windings approaching 45 degrees have higher torsional properties and those higher than 45 degrees have greater properties in the hoop direction. About 45 degrees is generally optimal for torque transmission, while axial loads are best transmitted with low angle fibre, e.g. approaching 0 degrees along the length of the tube. Other techniques for manufacturing PMCs include braiding, fibre placement techniques (including AFP), prepreg wrap techniques and pultrusion methods. Composite shafts may involve several layers, with different layers having different properties. For example, the fibre angle may be varied between layers to give different properties such as for bending resistance or impact resistance.

US 2016/153489 and European patent application number EP 3203094 describe joints in which end fittings are attached to composite shafts. In such joints the transmission of forces between the composite shaft and the end fitting is partly through engagement of the teeth (helical teeth or axial splines) that are provided on the metal end fitting and cut into the composite shaft, and partly through friction between the composite shaft and the flat metal lands (i.e. portions of the overall tooth profile, between the cutting teeth, that lie parallel to the axis of the composite shaft) that are formed between the teeth as part of the tooth profile of the end fitting. The frictional part of this engagement is important for improving the wear properties of the connection. In particular, this frictional engagement provided by the high assembly-torque provides a certain amount of preload on the joint that prevents the composite shaft from fretting (moving back and forth), which under high loads can cause wear and eventually cause joint failure. However, the provision of the flat lands in the tooth profile significantly increases the length of the end fitting which results in a lot of metal and a lot of weight which is undesirable. Additionally, the process of fitting these end fittings onto the composite shaft involves pressing or screwing the end fitting onto the shaft (either via compressive axial load or via a combination of compressive axial load and rotation) against the friction of these lands. This friction heats up the composite of the shaft and in order to combat these assembly loads, additional layers of composite are required that are not required for normal operation after joint attachment, again adding to the size and weight of the component.

EP 3382219 describes another joint in which a preload structure in an interference fit is used to apply a biasing force between the composite shaft and the end fitting. The end fitting is engaged with the composite shaft along an interface region (a generally axially extending region in which the two parts are radially overlapped and in contact with one another). The contact pressure at the interface may be increased by application of a preload structure (or in some cases a preload structure if it is provided in advance of engaging the two parts). Where the two parts are cylindrical, with one cylinder fitted over the other cylinder (e.g. one cylinder screwed onto or into the other cylinder), the contact pressure across the axial length of the interface region is substantially uniform, i.e. the pressure is substantially the same at each axial end of the interface region.

However there are certain advantages to having a tapered interface region, tapered at an angle to the shaft axis. The main advantage of a tapered interface region is that the engagement region than intersects all, or a large number of, fibre layers of the composite shaft. Therefore when forces are transmitted between the composite shaft and the end fitting, those forces are shared across all fibre layers rather than only on an outermost layer. This increases the strength of the joint, reducing the chances of failure through delamination under high force.

With tapered interface regions, while contact is made across many fibre layers within the shaft, the contact pressure introduced by the preload structure does not get applied evenly across the axial length of the joint. Instead, the contact pressure reduces from one end to the other such that the engagement strength is not uniform across the interface region and across all fibre layers.

It is desirable that the connection between the shaft and other components be structurally efficient so as to minimise weight while ensuring good force transmission and good joint robustness.

SUMMARY

According to this disclosure, there is provided a composite shaft with an end fitting mounted on at least one end of said shaft and a preload structure arranged to provide a biasing force to bias the composite shaft against the end fitting; wherein the end fitting has a first interface surface, the first interface surface being tapered at an angle to the shaft axis; wherein the shaft has a second interface surface for engagement with the first interface surface, the second interface surface being tapered at an angle to the shaft axis, the second interface surface extending axially from a first end to a second end, the shaft being thicker at the second end than at the first end; wherein the shaft has a third interface surface; wherein the preload structure has a fourth interface surface for engagement with the third interface surface; and wherein at least one of the shaft and the preload structure is shaped such that the contact pressure of the third interface against the fourth interface increases from the first end of the shaft to the second end of the shaft.

The varying contact pressure of the third interface against the fourth interface (i.e. the contact pressure of the preload structure against the composite shaft) compensates for the varying contact pressure between the first interface and the second interface such that the overall contact pressure between the composite shaft and the end fitting is more even across the axial length of the joint. Thus the force transfer between the composite shaft and the end fitting is more evenly distributed across the joint and therefore more evenly distributed across the composite layers so that overall joint strength is increased (or conversely allowing a reduced size of part for the same equivalent strength, thereby saving weight).

Figure 1A:
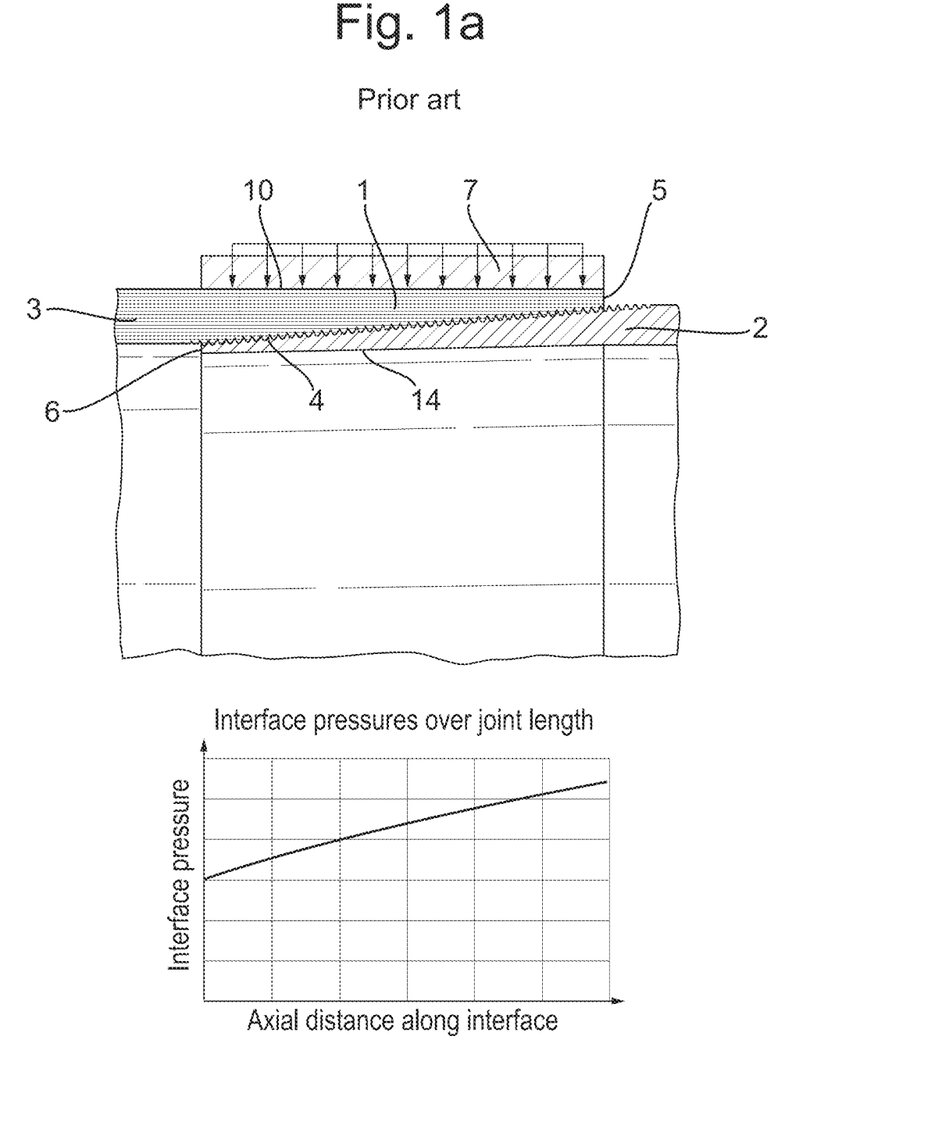
FIGS. 1a and 1b illustrate the varying contact pressure that arises between an end fitting and a composite shaft in prior art arrangements.
Figure 1B:
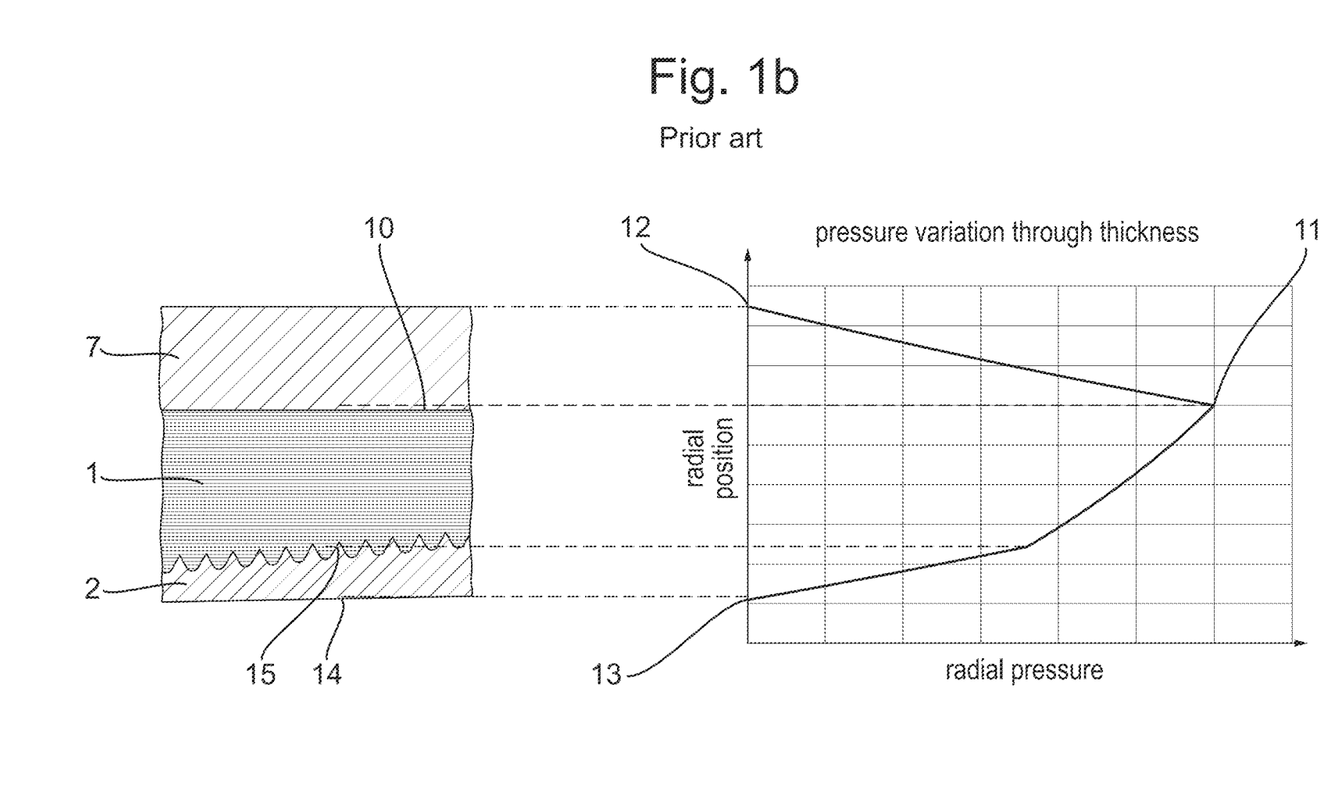

At a given axial position of the joint, the contact pressure varies radially through the thickness of the joint, with a maximum at the radius of the interface where the pressure is applied and with the pressure reducing from there down to zero at an external surface. FIGS. 1a and 1b illustrate this effect. FIG. 1a shows a composite shaft 1 in the form of a hollow tube, with an end fitting 2 screwed into the inside of the shaft 1. The composite shaft 1 is formed from many individual layers of fibre 3. The end fitting 2 has a first interface surface 4 formed on an outer diameter thereof. The end fitting 2 is tapered along the axial length of this first interface surface 4 such that the end fitting has a greater outer diameter adjacent to the end 5 of the composite shaft 1 and a smaller outer diameter at the distal end 6 of the end fitting 2 (i.e. the end that is screwed deepest into the composite shaft 1). A hoop ring 7 is provided on the outside diameter of the composite shaft 1 so that the composite shaft 1 is sandwiched between the hoop ring 7 (preload structure) and the end fitting 2. The hoop ring 7 is manufactured so that its inner diameter is slightly smaller than the outer diameter of the composite shaft 1 so that when it is press-fitted onto the shaft 1 it forms an interference fit and applies pressure to the outer diameter (third interface surface) of the composite shaft 1 via its inner diameter (fourth interface surface). The downward pointing arrows in FIG. 1a show the contact pressure due to this interference fit. FIG. 1b shows an enlarged cross-section through the joint.

The maximum pressure that is applied to the composite shaft 1 is at the interface 10 between the inner diameter of the hoop ring 7 and the outer diameter of the composite shaft 1, i.e. at the interface between the third interface surface and the fourth interface surface. In the arrangement shown in FIGS. 1a and 1b the hoop ring 7 applies the same contact pressure across the whole axial length of the ring/shaft interface 10. This pressure decreases from the maximum at the interface 10 towards the outer diameter of the ring 7 (where pressure reaches zero) and also towards the inner diameter of the end fitting 2 (where pressure also reaches zero). A graph of the pressure is shown to the right hand side of FIG. 1b. This graph shows pressure on the horizontal axis and radial position on the vertical axis. The maximum pressure at the interface 10 is shown at 11, the zero pressure point at the outer diameter of the hoop ring 7 is shown at 12, and the zero pressure point at the inner diameter of the end fitting 2 is shown at 13. As can be seen in FIG. 1b, the interface 15 between the composite shaft 1 and the end fitting 2 (which is the interface across which loads are transferred during use) is located in between the interface 10 (where the pressure is maximum) and inner diameter 14 of the end fitting 2 (where the pressure is zero). Thus the pressure experienced at this interface 15 depends on the location of that interface 15 with respect to the maximum and minimum pressures. The tapering of the interface causes this relative radial position to vary at different axial positions of the joint. Returning to FIG. 1a, at the right hand side of the joint (i.e. adjacent the end 5 of the composite tube 1), the interface 15 is closer the interface 10 than it is to the inner diameter 14 of the end fitting 2. At the left hand side of the joint (i.e. adjacent the end 6 of the end fitting 2), the interface 15 is closer to inner diameter 14 of the end fitting 2 than it is to the interface 10. Therefore the right hand end of the interface 15 experiences a pressure closer to the maximum than the left hand end. This pressure difference is illustrated by the graph underneath FIG. 1a which shows the contact pressure at the interface 15 on the vertical axis and axial position on the horizontal axis. As can be seen, the contact pressure increases steadily from the left hand side to the right hand side of the joint, in line with the taper. This axial variation in contact pressure means an axial variation in the strength of the joint and thus a variation in the load transfer at the different layers of fibre 3. As the strength of the joint is limited by the highest pressure that one layer can withstand, but the total strength is dependent on all layers, the overall joint strength is not optimal as the radially inner layers (in FIG. 1a) are not taking as much load as the outermost layers.

According to this disclosure, at least one of the shaft and the preload structure is shaped such that the contact pressure of the third interface against the fourth interface increases from the first end of the shaft to the second end of the shaft. This addresses the above problem by compensating for the axial pressure variation. Whereas in the arrangement of FIGS. 1a and 1b the contact pressure at the interface 10 is axially constant, the arrangements according to this disclosure have an axially varying pressure at the interface 10 between the preload structure and the composite shaft. As the pressure at the interface 15 between the composite shaft and the end fitting is an axially varying fraction of the maximum pressure at the corresponding axial position of the interface 10, the overall pressure at the shaft/end fitting interface 15 can be made more constant. In other words, if, for a given axial position x of the joint, the shaft/end fitting interface 15 experiences a fraction f(x) of the maximum pressure p(x) created at the shaft/preload structure interface 10, then by appropriately varying the maximum pressure p(x) at interface 10 created by the preload structure on the shaft, the contact pressure at interface 15, i.e. f(x)*p(x) can be made substantially constant across the joint (i.e. for all values of x).

Of course it will be appreciated that while it may be desirable to have an exactly constant pressure across the joint, this may in practice be difficult to achieve, but a substantially constant pressure can be achieved in which the pressure variation is much closer to constant than is achievable with a constant load from the preload structure. In some examples a substantially constant pressure means a pressure that does not change by more than 15% across the axial length of the interface. More preferably, the pressure does not change by more than 10%.

While any way of varying the contact pressure of the preload structure on the composite shaft can be used to compensate for the tapered joint, two main ways of achieving it are discussed in more detail here.

In some examples the third interface surface is tapered. The third interface surface is the surface of the composite shaft that contacts the fourth interface surface of the preload structure. By tapering the third interface surface, the interference fit between the third interface surface and the fourth interface surface varies axially along the taper such that the interference fit applies a greater pressure at one end of the joint than at the other end of the joint. One advantage of this arrangement is that the preload structure can have a simple form without requiring any special shaping and so the preload structure is very simple (and thus cost-effective) to manufacture.

The third interface surface may be tapered in the opposite direction to the second interface surface. In other words the taper angles are opposite (although not necessarily equal) and splay away in opposite directions from the shaft axis. The two tapers may thus get closer together (converge) as they approach the end of the composite shaft. At this end of the composite shaft the contact point between the end fitting and the composite shaft is closer to the preload structure and so experiences a higher fraction of the applied load. Therefore a smaller applied load is required and therefore a smaller interference fit is required. This arrangement also has the benefit that during the process of applying the preload structure to the joint, the applied pressure at each axial location of the joint only ever increases (as the preload structure is mounted onto the shaft, it comes into an ever greater interference fit with the shaft and thus gradually applies a higher force as it progresses onto the joint). Thus no over-pressures are experienced during the assembly process (i.e. no pressures higher than the final fully-assembled pressures).

The third interface surface can be tapered either as part of fibre placement process for manufacturing the composite shaft, or it could be machined on the shaft one after curing of the shaft. Machining the shaft after manufacture is likely to be the most cost efficient process as this taper only needs to be a very shallow angle to create a difference of interference fit. For example, a typical interference fit in such applications is 0.2 mm and a taper may therefore only need to create a difference of radius of less than 0.1 mm (i.e. difference of diameter of less than 0.2 mm) along the whole axial length of the joint.

In some examples, the interference fit between the preload structure and the composite shaft may be at least 80 microns, optionally at least 100 microns, optionally at least 150 microns. Thus the third interface and the fourth interface may be in an interference fit, the interference fit being created by the preload structure having a diameter that differs from the diameter of the composite shaft by e.g. at least 80 microns, at least 100 microns, or at least 150 microns. At the other end of the range, the diameters may differ by up to 500 microns, or in some rare cases up to 2400 microns.

In some examples the third interface surface may be tapered at an angle of between 0.05 degrees and 0.8 degrees to the shaft axis. The taper angle may be no more than 0.7 degrees or no more than 0.5 degrees or no more than 0.2 degrees.

In some examples the third interface surface may be tapered such that the diameter of the shaft along the third interface surface changes by at least 0.02 mm, optionally at least 0.05 mm, optionally at least 0.1 mm. In some examples the third interface surface may be tapered such that diameter of the shaft along the third interface surface changes by no more than 0.7 mm. In some examples the diameter may change by no more than 0.2 mm. In some examples the third interface surface may be tapered such that the diameter of the shaft along the third interface surface changes by between 0.02 and 0.15 mm.

In some examples the fourth interface surface is parallel to the shaft axis.

As discussed above, this makes the preload structure easier to manufacture. For example in some examples the preload structure can be made as a simple ring or support plug which can be cut from a longer cylinder of suitable material. Therefore several such preload structures could be formed and cut from a single unit, reducing the cost per unit.

A second way to vary the applied force from the preload structure to the composite shaft (and which may be used alone or in combination with the above-described tapering of the composite shaft) is to shape the preload structure such that the pressure it applies to the composite shaft varies axially along its length.

Thus in some examples the preload structure may have a greater radial thickness adjacent to the second end of the second interface surface than the radial thickness adjacent to the first end of the second interface surface. When the preload structure is pressed onto the shaft in an interference fit, the reaction force from the shaft causes a deformation in the preload structure. The extent of that deformation varies with the radial thickness of the preload structure (a greater radial thickness resisting deformation more than a lesser radial thickness) and any such deformation reduces the pressure applied at the interface. Therefore, by careful variation of the thickness (and thus deformability) of the preload structure, the contact pressure applied at the interface between the preload structure and the composite shaft can be varied and can thus compensate for the tapered interface between the shaft and the end fitting.

In some examples the radial thickness of the preload structure gets progressively thicker from the first end of the second interface surface to the second end of the second interface surface. In the absence of other factors, such a progressive change in thickness results in a progressive change in contact pressure applied at the interface between the preload structure and the composite shaft. As the tapered interface between the composite shaft and the end fitting also results in a progressive change in pressure at that interface, the progressive change in the thickness of the preload structure can be chosen to provide a corresponding change in applied pressure. The radial thickness of the preload structure may vary continuously (e.g. increase continuously) and it may vary linearly with axial position or it may have a non-linear thickness progression. The exact profile can be calculated and/or chosen for optimal compensation of the tapered interface so as to provide as even as possible a contact pressure at the interface between the composite shaft and the end fitting.

At the thin end, the preload structure may have a thickness as small as 0.4 mm, in some examples at least 0.5 mm, in other examples at least 1.5 mm and in further examples at least 2 mm. At the thick end, the preload structure may have a thickness of no more than 5 mm, no more than 3 mm or no more than 1 mm, depending on the target operating loads.

In some examples, for small operating loads, the preload structure has a thickness that tapers from (or otherwise changes from) 0.5 mm to 0.8 mm. For higher operating loads, the preload structure may have a thickness that tapers (or changes) from 1.8 mm to 2.8 mm. In certain heavy duty applications, the preload structure may have a thickness that tapers (or changes) from 2.5 mm to 4 mm.

In other examples, where the preload structure is a hoop plug, for small operating loads the preload structure may have a thickness that tapers from (or otherwise changes from) 0.6 mm to 0.9 mm.

In general, the thin end of the preload structure has a thickness that is at least 30% thinner than thick end. In some examples the thin end of the preload structure may have a thickness that is up to 40% thinner than the thick end.

A single preload structure may be used with a tailored profile to create the varying thickness. Such a preload structure may be manufactured in different ways depending on its material. For example a metal preload structure may be moulded or may be extruded or otherwise formed into the desired shape. Alternatively it may be machined to the desired shape from a larger block of material. The preload structure could in some examples instead be made from a fibre-reinforced polymer material in which case the shape could be formed during the fibre placement process (e.g. by winding different numbers of layers) or it may also be machined to shape from a larger reinforced-polymer structure. Purely by way of example, the preload structure may in some examples be a fibre-reinforced polymer ring. The thickness of the ring may be varied by grinding the ring to remove thickness as desired until the preferred shape is obtained.

In other examples the preload structure may comprise a plurality of preload structures with different thicknesses. Using a number of different preload structures with different thicknesses allows changes in thickness (and thus changes in applied pressure) without requiring complex shaping of the preload structure. While this may result in discrete changes in thickness rather than continuous changes in thickness. However, this will still achieve a smoothing of the contact pressure along the interface between the composite shaft and the end fitting, while allowing a particularly simple and cost-effective set of preload structures to be used. The plurality of preload structures may be arranged axially adjacent to one another, i.e. each provided at a different axial location, but adjacent to one another so that there are no gaps between them.

Although a purely frictional engagement may provide sufficient engagement strength in some examples, the end fitting may further comprise teeth on the first interface surface engaging with the composite shaft. The first interface surface may thus be a toothed surface.

The preload structure may be applied to the composite shaft in a subsequent operation to the mounting of the end fitting to the shaft. By applying the preload in a subsequent operation, the biasing force that is applied by the preload does not impede the mounting of the end fitting to the shaft and does not add to the friction and heat generation that is involved in that mounting process. Instead, the joint is formed under minimal stress conditions, thus allowing the shaft to be constructed only to withstand this reduced stress. The preload structure then adds a preload to the already formed joint, thus increasing its fatigue resistance and by placing the shaft into an advantageous residual stressed state prior to any operation loads increases the joint strength.

Preferably a tooth profile taken perpendicular to the teeth comprises substantially no flat land portions (i.e. portions of the overall tooth profile that lie parallel to the axis of the composite shaft) in frictional contact with the shaft. This is in contrast to the prior art (such as EP 3203094) discussed above in which such lands provided much beneficial friction. The preload structure avoids the need for such additional frictional surfaces and thus the size of the end fitting can be reduced by omitting them. The result is a stronger joint for a given length and hence a weight saving. Additionally, with no flat lands the required assembly load and temperature generation is less, resulting in a further weight saving to the components as the composite shaft can be optimised for the operational loads without additional consideration for accommodating end fitting assembly loads.

In some examples, the toothed surface may comprise at least one tooth formed as a helical thread engaging with the interface region. The helical thread (or plurality of helices in the case of a multi-start thread arrangement) extends substantially circumferentially around the interface region (although also with an axial component so as to form a helix). To engage the helical thread(s) with the interface region, the end fitting and shaft are rotated relative to one another so as to twist the end fitting onto the shaft. To maximise the efficiency of force transfer in the axial direction (i.e. for tension/compression), it is desirable to make the thread as perpendicular as possible to the shaft axis. This has the effect of increasing the amount of engagement required to fully screw the end fitting onto the shaft for a given length of joint. However, the taper of the shaft and the end fitting reduces the distance that needs to be screwed (compared with a non-tapered joint)

A multi-start thread may be used on the end fitting, i.e. one with multiple adjacent helices interleaved with one another. However, in some preferred examples the thread is a single-start thread. The multi-start thread may have advantages in reducing the number of turns required to mount the end fitting onto the shaft, but it also requires a reduction in the angle between the threads and the shaft axis (i.e. the threads must be less perpendicular to the shaft axis) which, as discussed before diverges from the ideal, perpendicular arrangement for axial load transmission.

Mounting the end fitting to the shaft via a helical thread makes the joint more suitable for transmitting axial forces than a joint that is engaged via axial splines onto the interface region. This helical attachment thus forms a tension/compression joint that is more suitable for shafts that transmit tension and/or compression forces.

As discussed above, one benefit of tapering the shaft and the end fitting (i.e. tapering of the first interface surface and the second interface surface) is that the process for engaging the two together can be accomplished in less time and over a short distance. This taper allows a certain amount of axial overlap between the two parts before contact is made between the end fitting and the interface region of the shaft. When contact is made, it is made along substantially the whole of the interface region simultaneously. Further axial movement between the two parts results in further overlap of the two parts. The taper on the shaft exposes a significant cross section of the shaft to the end fitting and results in engagement with the end fitting across that exposed portion. This ensures that engagement is not simply with the outermost or innermost surface portion of the shaft, reducing the chance of delamination when force is transmitted across the joint.

In some examples the shaft may be a multi-layer filament shaft and the tapered interface region exposes a plurality of layers of filaments (fibres) to the toothed surface. For example, a filament-wound shaft may typically be formed by winding filaments around a mandrel in a helix (with varying helix angle, depending on application) back and forth so as to build up multiple layers of filaments to the desired thickness. As described above, different layers may be formed with different helix angles to give different properties to the finished product. The wound filaments are normally wet-out or coated in resin so as to form a matrix of resin and filaments that is cured to solidify and form the final composite.

Tapering the interface region by cutting or grinding or by any other material removal process to expose the filament ends ensures that all, or most layers of fibres (typically helical layers of fibres) that form the shaft are engaged with the end fitting, thus ensuring excellent load sharing of forces between the end fitting and the shaft. Distributing the applied forces across more fibres, in particular across more fibre layers of the shaft greatly increases the strength of the joint. During the mounting process, in some examples the teeth of the toothed surface are driven into the composite shaft, compressing the composite material (which may include compression of the resin as well as compressing the fibres) and thus forming a very strong attachment. As more of the teeth engage with the interface region the strength of the joint increases.

This arrangement together with the varying contact pressure applied by preload structure provides a very strong and efficient joint. In particular the joint is structurally efficient in terms of its strength to weight ratio. The end fitting can be formed as a single piece and can use less material (e.g. less metal). Further, the better load distribution amongst layers means that less composite material can be used in the joint region compared with other joining techniques. This also reduces cost and is simple to manufacture and assemble.

In some examples the second interface surface is located radially outwardly of the third interface surface, wherein the composite shaft is hollow and wherein the preload structure is located radially inside the composite shaft.

In such examples the shaft may be a hollow tube, and the taper of the second interface surface is formed on the outside of the shaft and the preload structure is provided within the hollow tube.

With the taper of the second interface surface formed on the outside of the shaft, the outer diameter of the shaft reduces towards the end of the shaft. This forms a convex conical end to the shaft (although as the shaft is hollow, this is not a complete cone, resulting in a substantially frustoconical shaped end). The end fitting may then have a concave cone shape (or frustoconical shape) that matches and engages therewith.

In such examples the preload structure may take any suitable form as long as it provides a suitable preload to the shaft. It may form a continuous circumferential structure inside the hollow shaft and engaging with its inner diameter. The preload structure may be generally cylindrical in shape. The preload structure may be solid or partially segmented. In at least some examples, the preload structure may take the form of a hoop ring or a plug.

In some examples the third interface surface may be located radially outwardly of the second interface surface and wherein the preload structure is provided externally around the circumference of the composite shaft.

In such examples the shaft may be a hollow tube, the taper of the second interface surface is formed on the inside of said shaft and the preload structure is provided on the outside of the shaft.

With the taper of the second interface surface formed on the inside of the shaft, the inner diameter of the shaft increases towards the end of the shaft. This forms a concave conical end to the shaft (although as the shaft is hollow, this is not a complete cone, resulting in a concave frustoconical shaped end). The end fitting then has a convex cone shape (or frustoconical shape) that matches and engages therewith.

The angle of the taper of the second interface surface (and of the first interface surface) may be selected according to the desired purpose of the shaft, In some examples, the taper is at an angle to the shaft axis of no more than 20 degrees, optionally no more than 15 degrees, optionally no more than 10 degrees, optionally no more than 7 degrees, optionally no more than 5 degrees.

The preload structure may be made of any suitable rigid material that is capable of forming and maintaining an interference fit with the end of the shaft. In some examples, the preload structure is made of a metallic material. In some examples, the preload structure is made of a polymer matrix composite material, for example a fibre-reinforced polymer material. In some examples, the preload structure may comprise one or more materials chosen from: metals, alloys (with or without fibre reinforcement), fibre-reinforced polymers or fibre-reinforced resins.

In some examples the preload structure is a metallic ring. Such a ring may be provided on the outside of the shaft to provide an inwardly directed force onto the composite shaft. In other examples the ring may be provided on the inside of the shaft to provide an outwardly directed force onto the composite shaft. In such examples a ring requires less material than a solid plug, but does require more rigidity.

According to another aspect of this disclosure there is provided a method of mounting an end fitting to a composite shaft comprising: engaging a first interface surface of the end fitting with a second interface surface of the composite shaft, wherein the first interface surface and the second interface surface are tapered at an angle to the shaft axis such that the shaft is thicker at a second axial end of the second interface surface than at a first axial end of the second interface surface; and then engaging a third interface surface of the shaft by a fourth interface surface of a preload structure so as to bias the first interface surface against the second interface surface; wherein at least one of the shaft and the preload structure is shaped such that the contact pressure of the third interface against the fourth interface increases from the first axial end to the second axial end.

The features described above in relation to the structure of the joint apply equally to this method.

The composite shaft described above may act as an actuator rod or other force transmission component. It will be appreciated that the joint described here may be used in a wide range of applications, wherever tension/compression elements or torque transmission elements may be used. Some example applications include aerospace applications such as piston rods, struts, control actuators, etc. Other applications include drive shafts or actuators for torque transmission.

BRIEF DESCRIPTION OF DRAWINGS

One or more non-limiting examples will now be described, by way of example only, and with reference to the accompanying figures in which.

DETAILED DESCRIPTION

FIGS. 1a and 1b and the problem of varying contact pressure was described above.

Figure 2:
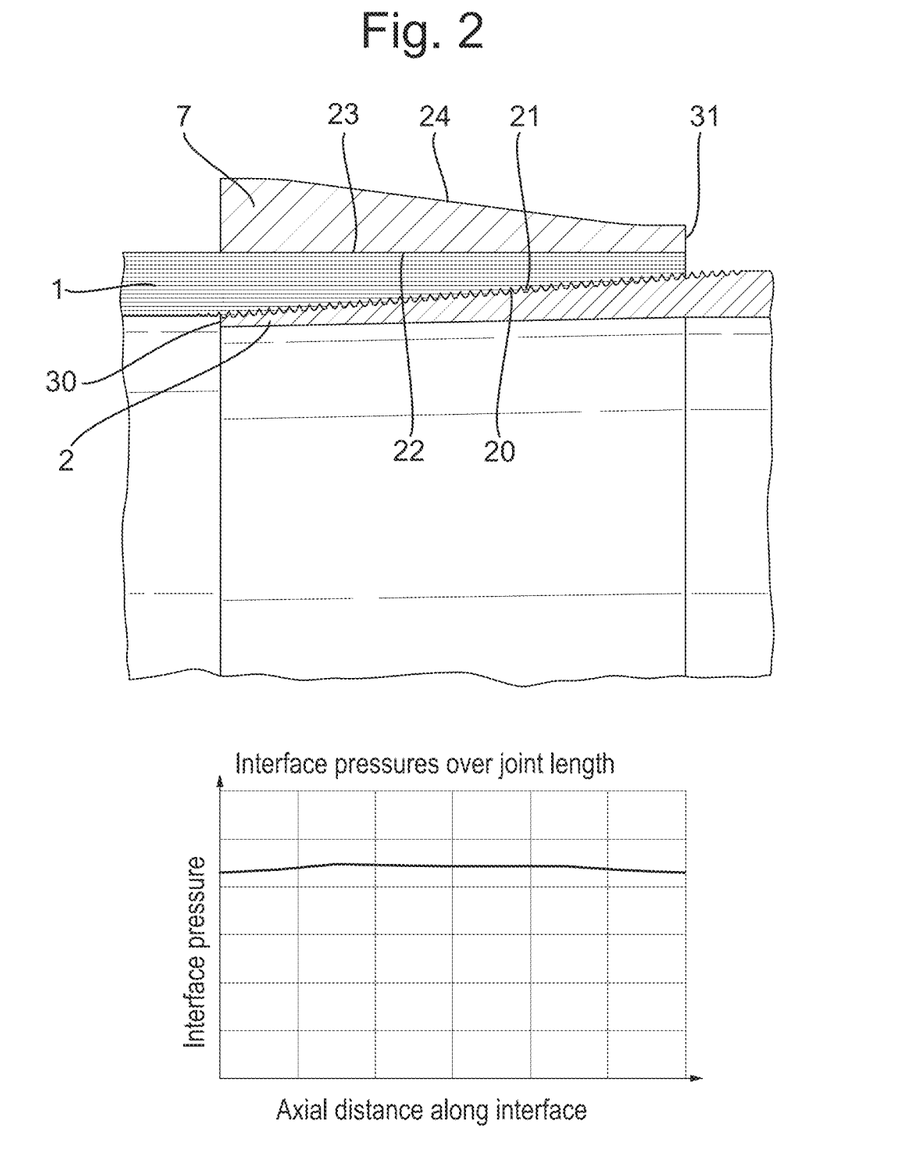
FIG. 2 shows a first way of reducing the variation in contact pressure.

FIG. 2 shows one way of attaching an end fitting 2 to a composite shaft 1. In the example shown in FIG. 2 the composite shaft 1 is a hollow shaft and the end fitting 2 is fitted inside the end of the shaft 1. The end fitting 2 has a first interface surface 20 formed on the outer diameter thereof. The first interface surface 20 is tapered such that the radial thickness of the end fitting 2 gets smaller towards the end 30 thereof. The composite shaft 1 has a second interface surface 21 formed on its inner diameter that is also tapered at an angle that matches the taper of the first interface surface 20.

In this particular example the outer surface of the end fitting 2 (i.e. the outer surface of the first interface surface 20 is a toothed surface, having one or more helical teeth formed thereon so that the end fitting 2 can be mounted to the shaft 1 by screwing the end fitting 2 into the shaft 1. However it will be appreciated that in other examples the first interface surface 20 may have axial splines instead of helical teeth or may have no teeth and just engage via friction.

A preload structure in the form of a hoop ring 7 is provided on the radially outer surface of the composite shaft 1, specifically on a third interface surface 22 of the composite shaft 1. The hoop ring 7 has a fourth interface surface 23 on its radially inner surface that engages with the third interface surface 22 on the composite shaft 1. The inside of the hoop ring 7 (i.e. the fourth interface surface 23) is cylindrical, engaging around the whole circumference of the composite shaft 1 and in an interference fit therewith. The hoop ring 7 thereby provides a contact pressure at the interface between the third interface surface 22 and the fourth interface surface 23 and thereby also provides a contact pressure at the interface between the first interface surface 20 and the second interface surface 21. This contact pressure preloads the interface between the first interface surface 20 and the second interface surface 21 so that it is less susceptible to fretting and wear (caused by relative movement between the shaft 1 and the end fitting 2) during subsequent use.

As can be seen in FIG. 2, the hoop ring 7 has a shaped outer surface 24. The outer surface 24 is shaped so that the hoop ring is radially thicker at the end 32 adjacent to the end 30 of the end fitting 2 than it is at the opposite end 31. Thus the hoop ring 7 is radially thicker where the composite shaft 1 is radially thick and the hoop ring 7 is radially thinner where the composite shaft 1 is radially thin. The varying radial thickness of the hoop ring 7 means that the hoop ring 7 does not provide a uniform contact pressure axially along the length of the interface between the third interface surface 22 and the fourth interface surface 23. Instead, the thicker end 32 of the hoop ring 7 provides a greater force than the thinner end 31. This is due to the increased flexibility of the hoop ring 7 at the thinner end 31 such that it can deform slightly more at the thinner end 31 and therefore does not impart as great a force on the composite shaft 1.

As the amount of force applied by the hoop ring 7 varies axially along the length of the interface, increasing towards the right hand end in FIG. 2, this compensates for the corresponding reduction in force caused by the tapered interface between the composite shaft 1 and the end fitting 2 as discussed above in relation to FIGS. 1a and 1b. Thus, while the thicker end 32 of the hoop ring 7 provides a higher force at the interface between the third interface surface 22 and the fourth interface surface 23, the amount of that pressure that is applied at the interface between the first interface surface 20 and the second interface surface 21 is reduced due to the distance between those two interfaces. By appropriately shaping the thickness of the hoop ring 7 (by varying its radial thickness and thus its outer diameter), the contact pressure at the tapered interface between the first interface surface 20 and the second interface surface 21 can be evened out so that the load transfer across that interface is better distributed and more efficient and the joint is stronger.

Figure 3:
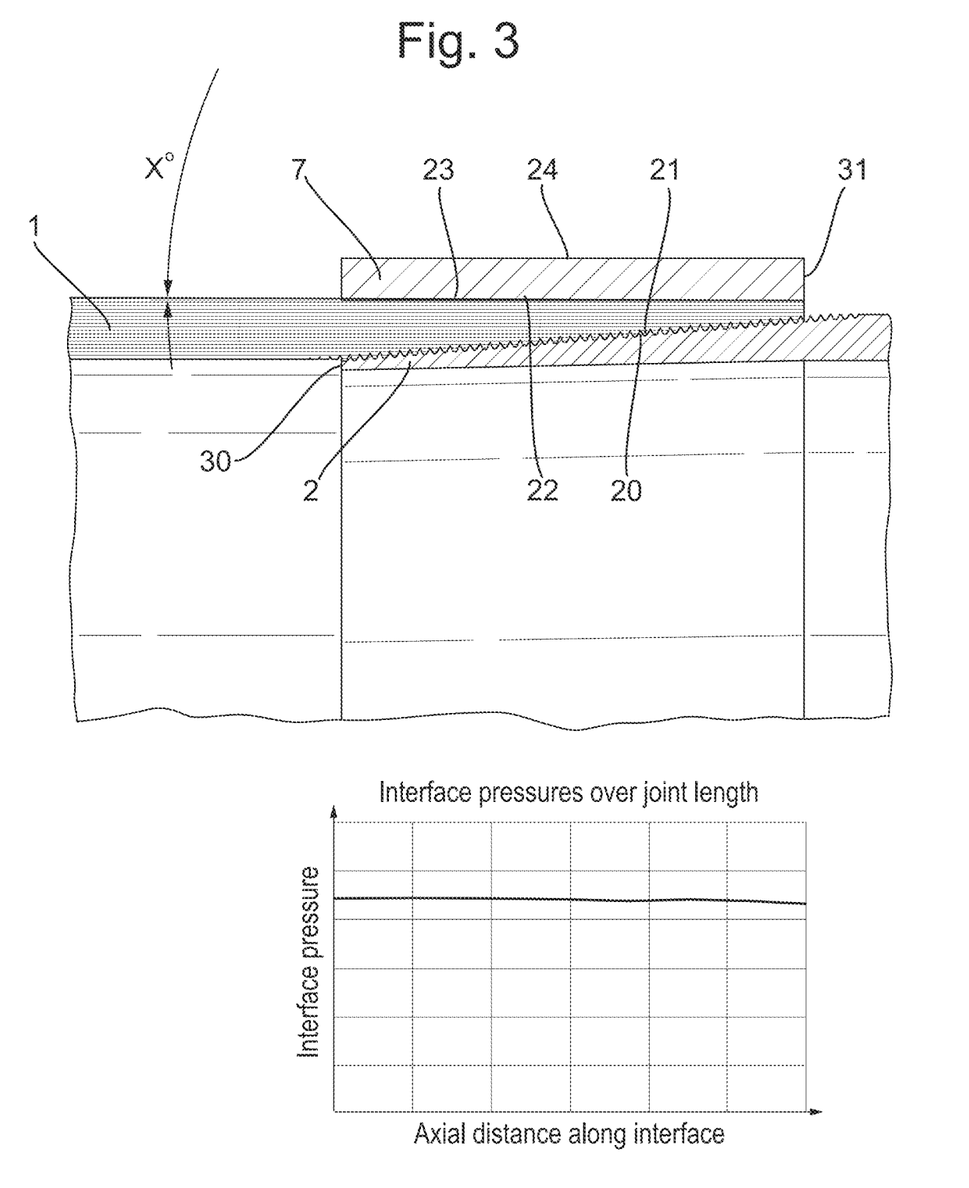
FIG. 3 shows a second way of reducing the variation in contact pressure.

FIG. 3 shows another way of attaching an end fitting 2 to a composite shaft 1. As with FIG. 2, in the example shown in FIG. 3 the composite shaft 1 is a hollow shaft and the end fitting 2 is fitted inside the end of the shaft 1. The end fitting 2 has a first interface surface 20 formed on the outer diameter thereof. The first interface surface 20 is tapered such that the radial thickness of the end fitting 2 gets smaller towards the end 30 thereof. The composite shaft 1 has a second interface surface 21 formed on its inner diameter that is also tapered at an angle that matches the taper of the first interface surface 20.

In this particular example the outer surface of the end fitting 2 (i.e. the outer surface of the first interface surface 20 is a toothed surface, having one or more helical teeth formed thereon so that the end fitting 2 can be mounted to the shaft 1 by screwing the end fitting 2 into the shaft 1. However it will be appreciated that in other examples the first interface surface 20 may have axial splines instead of helical teeth or may have no teeth and just engage via friction.

A preload structure in the form of a hoop ring 7 is provided on the radially outer surface of the composite shaft 1, specifically on a third interface surface 22 of the composite shaft 1. The hoop ring 7 has a fourth interface surface 23 on its radially inner surface that engages with the third interface surface 22 on the composite shaft 1. The inside of the hoop ring 7 (i.e. the fourth interface surface 23) is cylindrical, engaging around the whole circumference of the composite shaft 1 and in an interference fit therewith. The hoop ring 7 thereby provides a contact pressure at the interface between the third interface surface 22 and the fourth interface surface 23 and thereby also provides a contact pressure at the interface between the first interface surface 20 and the second interface surface 21. This contact pressure preloads the interface between the first interface surface 20 and the second interface surface 21 so that it is less susceptible to fretting and wear (caused by relative movement between the shaft 1 and the end fitting 2) during subsequent use.

The example of FIG. 3 differs from that of FIG. 2 in that the preload structure (hoop ring) 7 in FIG. 3 does not have a shaped outer surface 24, but rather is a simple cylinder of material with a uniform thickness axially along its length. Instead of varying the contact pressure at the interface between the hoop ring 7 and the composite shaft 1 by shaping the hoop ring 7 (as in FIG. 2), the contact pressure is instead varied by shaping the outer surface of the composite shaft 1. Specifically the outer surface (i.e. the third interface surface 22) of the composite shaft 1 is tapered in the opposite way to the taper of the second interface surface 21 so that the two tapers converge towards the end 33 of the composite shaft 1. This taper is illustrated in FIG. 3 by the angle $X°$. In this way the interference fit that is formed by the hoop ring 7 with the composite shaft 1 is less at the end 33 of the composite shaft 1 (and the end 31 of the hoop ring 7) than it is at the opposite end (at the end 32 of the hoop ring 7). The smaller interference fit provides less contact pressure at the interface between the third interface surface 22 and the fourth interface surface 23. This has the same effect as described above with respect to FIG. 2 in that the varying pressure applied at the interface between the third interface surface 22 and the fourth interface surface 23 also varies the pressure applied at the interface between the first interface surface 20 and the second interface surface 21. As with the example of FIG. 2, this varying application of pressure compensates for the variation in contact pressure caused by the tapered first and second interface surfaces 20, 21 and thus evens out the load transfer between the composite shaft 1 and the end fitting 2 so that the joint is overall stronger and more efficient.

Figure 4:
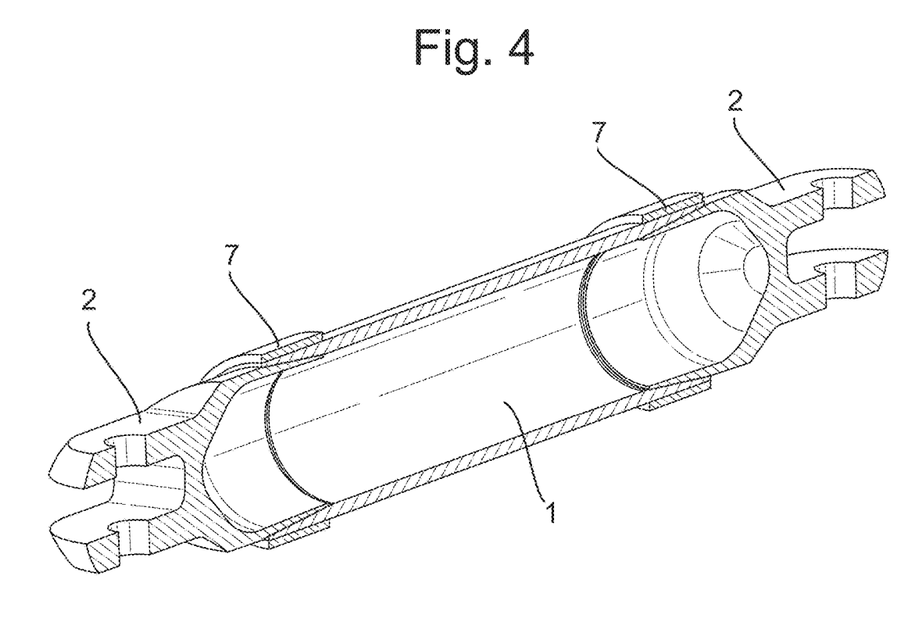
FIGS. 4 shows a lengthwise cross-section through a composite shaft with two end fittings attached according to the method illustrated in FIG. 3.
Figure 5:
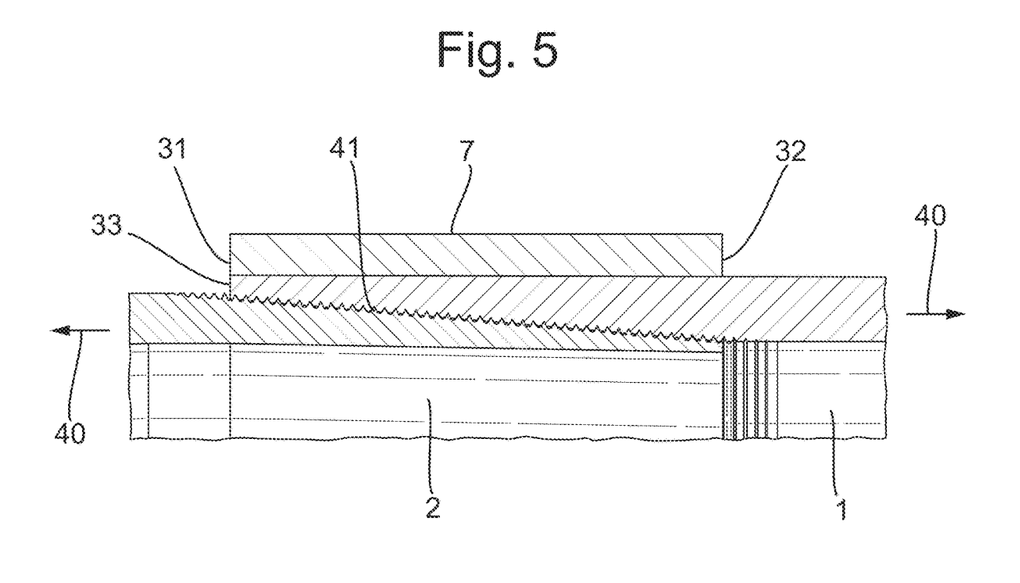
FIG. 5 shows a cross-section through one joint of FIG. 4.

FIGS. 4 shows a lengthwise cross-section through a composite shaft 1 with two end fittings 2 attached according to the method illustrated in FIG. 3. A preload structure 7 (in the form of a hoop ring) is provided on each end. FIG. 5 shows a cross-section through one joint of FIG. 4. FIG. 5 is essentially equivalent to FIG. 3, although it additionally shows arrows 40 that illustrate that this joint is well suited for transmission of tension/compression forces. This is due to the presence of helical teeth 41 on the outer surface of the end fitting 2.

Figure 6:
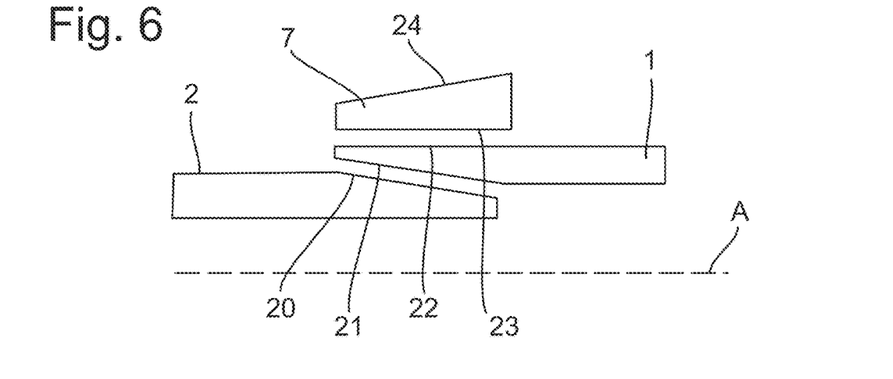
FIGS. 6 to 10 show different arrangements of the various parts that are possible in different examples.
Figure 7:
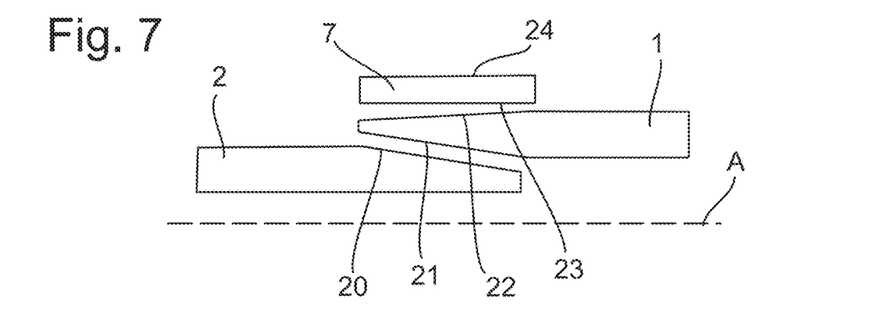
Figure 8:
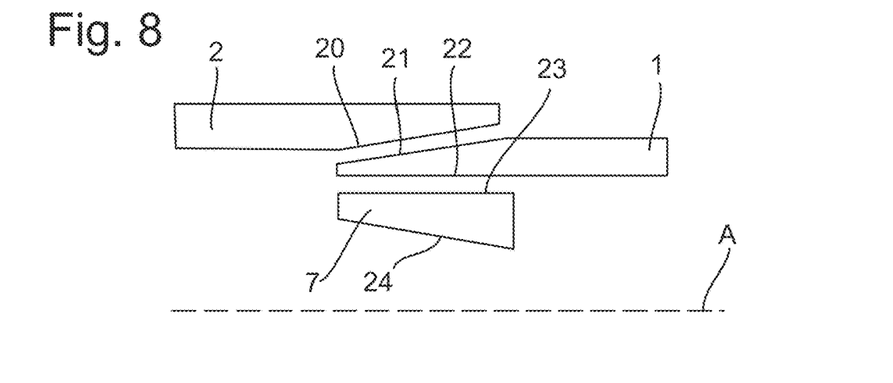
Figure 9:
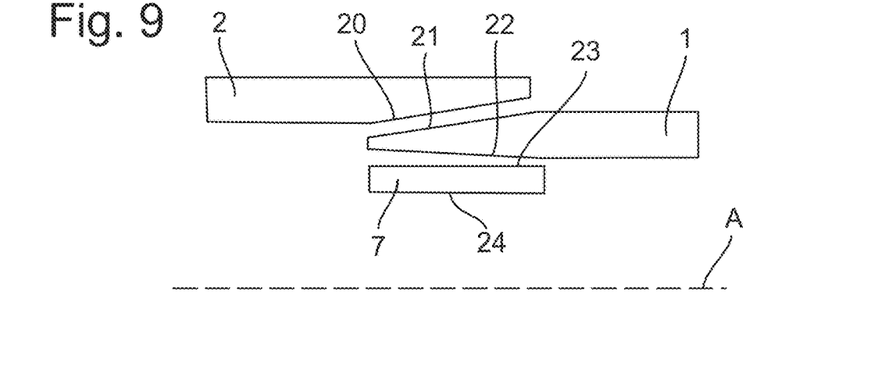

FIGS. 6 to 9 show different configurations of the joint. FIGS. 2 and 3 show the end fitting 2 screwed into the inside of the composite shaft 1 with the preload structure 7 provided on the outside of the composite shaft 1. FIGS. 6 and 7 are essentially equivalent to those arrangements of FIGS. 2 and 3, with the axis A of the composite tube 1 (and the end fitting 2 and preload structure 7) being indicated by a dashed line. It will be appreciated that these figures show a cross-section which is rotationally symmetric around the axis A. FIGS. 8 and 9 show the alternative arrangements in which the end fitting 2 is screwed (or otherwise attached) to the outside of the composite shaft 1 with the preload structure 7 provided as a plug on the inside of the composite shaft 1 (and thus closer to the axis A than the end fitting 2 and composite shaft 1). In each of FIGS. 6 to 9 the first interface surface 20, second interface surface 21, third interface surface 22 and fourth interface surface 23 are indicated.

Figure 10:
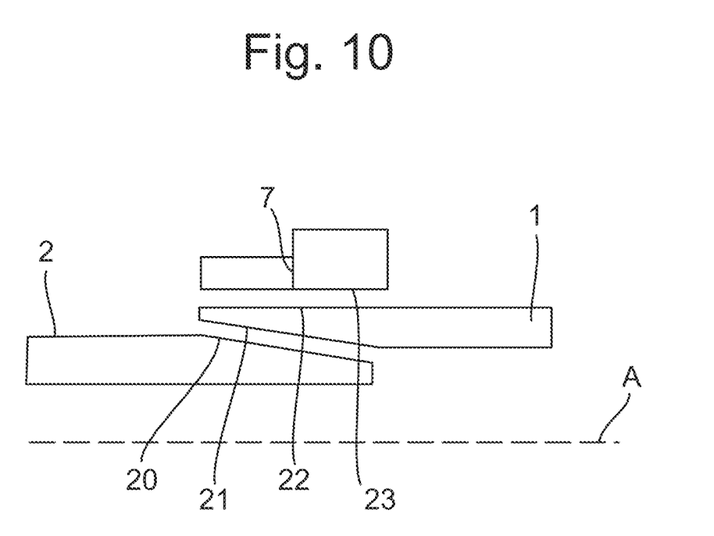

For illustrative purposes, FIGS. 6 to 9 also show the various parts in an exploded view so that the shapes can be seen more clearly. In FIGS. 7 and 9 the taper of the third interface surface has been greatly exaggerated for illustrative purposes as an accurate representation would be barely discernible. FIG. 10 shows a preload structure 7 that includes a plurality of preload structures with different thicknesses.

The invention claimed is:

1. A composite shaft with an end fitting mounted on at least one end of said shaft and a preload structure arranged to provide a biasing force to bias the composite shaft against the end fitting;
   wherein the end fitting has a first interface surface, the first interface surface being tapered at an angle to the shaft axis;
   wherein the shaft has a second interface surface for engagement with the first interface surface, the second interface surface being tapered at an angle to the shaft axis, the second interface surface extending axially from a first end to a second end, the shaft being thicker at the second end than at the first end;
   wherein the shaft has a third interface surface;
   wherein the preload structure has a fourth interface surface for engagement with the third interface surface; and
   wherein at least one of the shaft and the preload structure is shaped such that the contact pressure of the third interface against the fourth interface increases from the first end of the shaft to the second end of the shaft.

2. The composite shaft as claimed in claim 1, wherein the third interface surface is tapered.

3. The composite shaft as claimed in claim 2, wherein the third interface surface is tapered in the opposite direction to the second interface surface.

4. The composite shaft as claimed in claim 2, wherein the third interface surface is tapered at an angle of between 0.05 degrees and 0.8 degrees to the shaft axis.

5. The composite shaft as claimed in claim 2, wherein the third interface surface is tapered such that diameter of the shaft along the third interface surface changes by at least 0.02 mm.

6. The composite shaft as claimed in claim 5, wherein the third interface surface is tapered such that diameter of the shaft along the third interface surface changes by at least 0.05 mm.

7. The composite shaft as claimed in claim 6, wherein the third interface surface is tapered such that diameter of the shaft along the third interface surface changes by at least 0.1 mm.

8. The composite shaft as claimed in claim 1, wherein the third interface and the fourth interface are in an interference fit.

9. The composite shaft as claimed in claim 8, wherein the interference fit is created by the preload structure having a diameter that differs from the diameter of the composite shaft by at least 80 microns.

10. The composite shaft as claimed in claim 1, wherein the fourth interface surface is parallel to the shaft axis.

11. The composite shaft as claimed in claim 1, wherein the preload structure has a greater radial thickness adjacent to the second end of the second interface surface than the radial thickness adjacent to the first end of the second interface surface.

12. The composite shaft as claimed in claim 11, wherein the radial thickness of the preload structure gets progressively thicker from the first end of the second interface surface to the second end of the second interface surface.

13. The composite shaft as claimed in claim 11, wherein the preload structure comprises a plurality of preload structures with different thicknesses.

14. The composite shaft as claimed in claim 1, wherein the end fitting further comprises teeth on the first interface surface engaging with the composite shaft.

15. The composite shaft as claimed in claim 1, wherein the second interface surface is located radially outwardly of the third interface surface, wherein the composite shaft is hollow and wherein the preload structure is located radially inside the composite shaft.

16. The composite shaft as claimed in claim 1, wherein the third interface surface is located radially outwardly of the second interface surface and wherein the preload structure is provided externally around the circumference of the composite shaft.

17. The composite shaft as claimed in claim 16, wherein the preload structure is a metallic ring.

18. A method of mounting an end fitting to a composite shaft comprising:
   engaging a first interface surface of the end fitting with a second interface surface of the composite shaft, wherein the first interface surface and the second interface surface are tapered at an angle to the shaft axis such that the shaft is thicker at a second axial end of the second interface surface than at a first axial end of the second interface surface; and then engaging a third interface surface of the shaft by a fourth interface surface of a preload structure so as to bias the first interface surface against the second interface surface;

wherein at least one of the shaft and the preload structure is shaped such that the contact pressure of the third interface against the fourth interface increases from the first axial end to the second axial end.

* * * * *